Sept. 6, 1966    K. A. MOLITOR    3,270,785
PORTABLE MOTOR-DRIVEN SAW
Filed Oct. 28, 1963    2 Sheets-Sheet 1
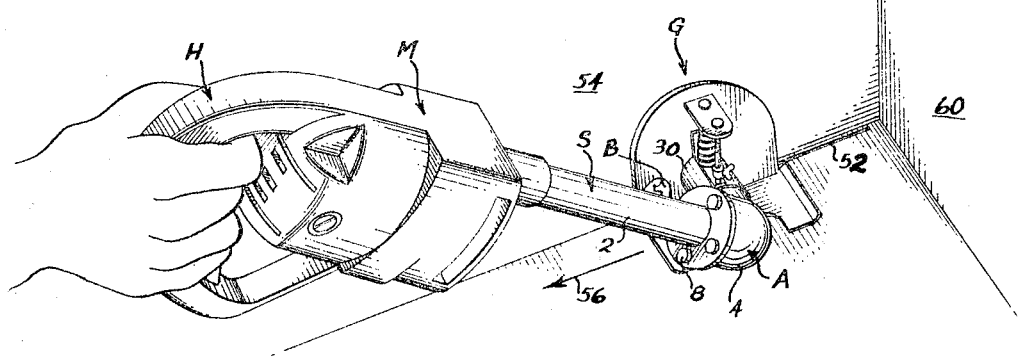
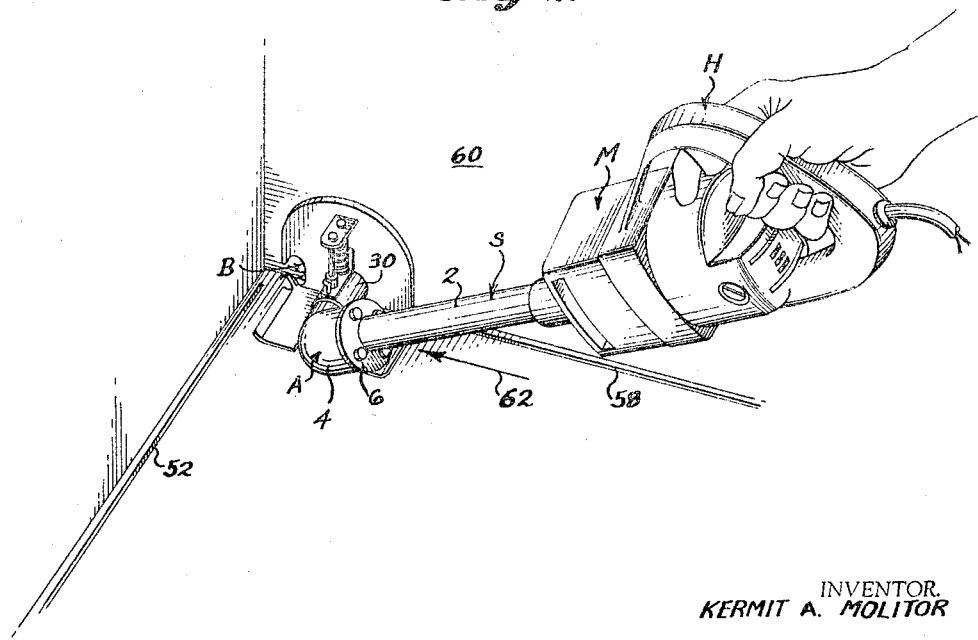
INVENTOR.
KERMIT A. MOLITOR
BY Reynolds and Christensen
ATTORNEYS Sept. 6, 1966 K. A. MOLITOR 3,270,785
PORTABLE MOTOR-DRIVEN SAW
Filed Oct. 28, 1963 2 Sheets-Sheet 2
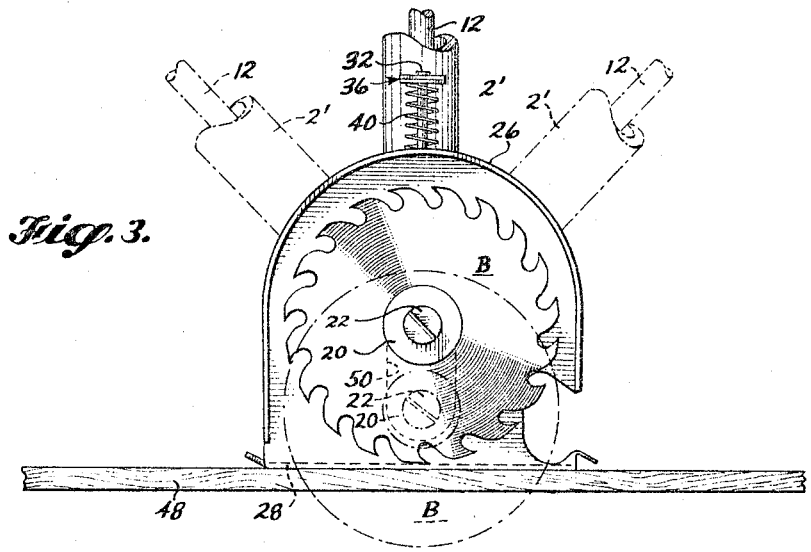
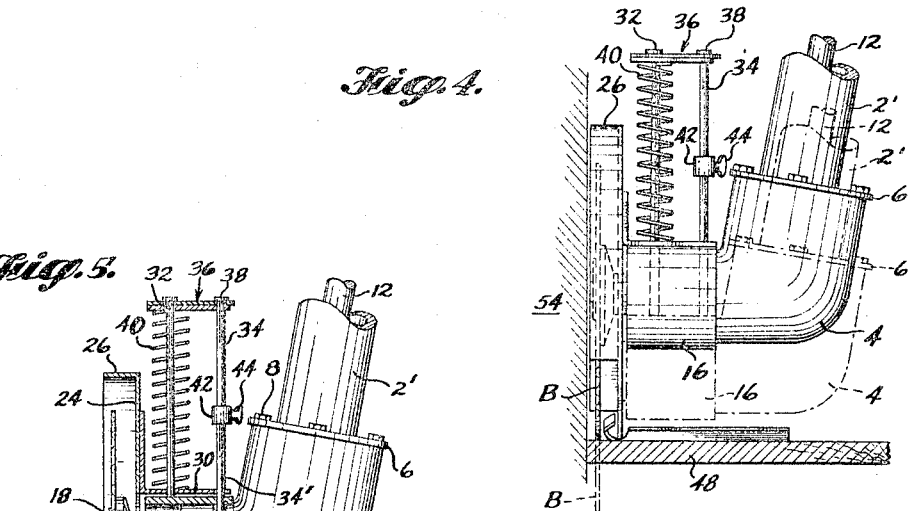
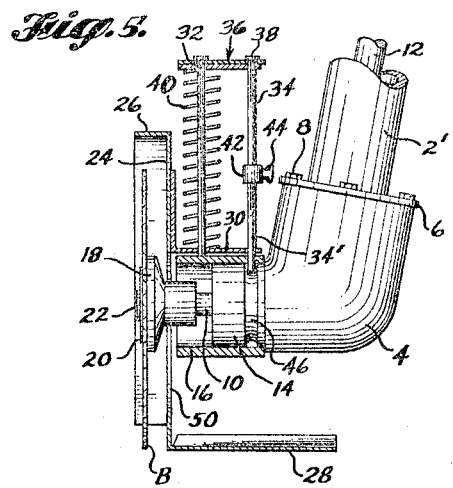
INVENTOR.
KERMIT A. MOLITOR
BY
Reynolds and
Christensen
ATTORNEYS United States Patent Office 3,270,785
Patented Sept. 6, 1966

3,270,785
PORTABLE MOTOR-DRIVEN SAW
Kermit A. Molitor, 712 Hemitt, Bremerton, Wash.
Filed Oct. 28, 1963, Ser. No. 319,394
10 Claims. (Cl. 143—43)

This invention relates to portable motor-driven saws and more particularly to electric motor-driven circular or disc saws of the type which are sufficiently light and portable to be carried, manipulated and guided with one hand.

Various saws of this nature are known in which the circular or disc blade is mounted on an arbor driven by an electric motor and the arbor and motor are housed in a casing to which is attached an operating head comprising a guard and a planar guide for the blade. A handle is also affixed to the casing and is disposed in such an inclined attitude with respect to the head that the operator can comfortably grasp the handle and apply that measure of force to it which is necessary to urge the saw along the line of the cut.

Such saws are suitable for most original construction where cuts and openings are made as the structural elements are assembled. However, in the case of remodeling work involving existing structure, these saws are not always readily adaptable to the job at hand. In the latter instance, it is often necessary to make cuts and openings under cramped circumstances and the operating head is not sufficiently versatile of position to enable the operator to manipulate and guide the saw from the handle alone. For example, in removing a panel or in opening up an electrical outlet in the corner of a room, it is necessary in the case of one of the cuts, to grip the body of the motor housing for purposes of guiding the saw out of the corner. Where the cuts are made along the ceiling line in such a corner, it is also necessary to provide some means for enabling the operator to reach the ceiling with his saw.

The primary object of the present invention is to provide a saw of this nature which is better adapted to remodeling work and more quickly and easily manipulated in the circumstances of such work. A further object is to provide a saw of this nature in which the guard and the guide, and the handle, are relatively adjustable so as to enable the operator to adapt the saw to the circumstances under which he must make the cut. Another object is to provide such a saw in which the guard and guide are in a single piece that is turnable about the arbor housing and adjustable radially of the arbor for purposes of varying the depth of the cut. A still further object is to provide a saw having these features and also capable of reaching points lying beyond the arm's reach of the operator, such as when a cut is made in the ceiling of a room.

These and other objects are realized, according to the invention, by a portable saw of my conception in which the housing for the saw arbor and motor is equipped with a collar member that is turnable about the arbor, and the collar member has means thereon which define a slideway that extends along a line coincident with a radius of the arbor. A shield defining a guard and a planar guide for a disc blade mounted on the arbor, is equipped with bracket means that are slidably engaged on the slideway, the planar guide being so positioned in relation to the arbor that its base lies in a plane extending normal to the aforementioned line. Limits are defined for the slideway at points relatively remote from and relatively adjacent to the base of the guide, and resilient means are used to urge the bracket means to move into a position abutting the slideway limit disposed relatively adjacent to the base of the guide so that the shield tends normally to assume a coaxial relationship with the blade, yet when pressure is applied to the base of the guide by the board or other article being cut, the shield is forced upwardly against the bias of the resilient means to allow a chord segment of the blade to cut into the board. The depth of the cut is determined by the span between the limits of the slideway and preferably the slideway limit disposed relatively remote from the base of the guide is adjustable in directions parallel to the aforementioned line so as to enable variation in the depth of the cut.

It is also preferred to house the arbor and the motor in separate casings which are rigidly connected by an elongated stem having a section of the arbor extending therethrough to transmit the drive of the motor to the blade. In this way, the saw can be used to reach points not within the arm's reach of the operator.

In the case of all embodiments, it is evident that the shield can be oriented at any angle with respect to the housing and that this is possible without interfering with the functioning of the guard and the guide. Given this feature, then, it is also evident that the guard and guide are likewise relatively adjustable with respect to any handle affixed to the housing.

Other features and advantages will appear from the following more detailed description of a presently preferred embodiment of the invention. Reference is made in this description to the accompanying drawings wherein:

FIGURES 1 and 2 are views in perspective of this embodiment in use in making an opening in the corner of a room;

FIGURES 3 and 4 are side and front elevational views, respectively, of the operating head of this embodiment when in such use; and FIGURE 5 is a cross-sectional view of the mechanism of FIGURES 3 and 4 taken along the line 5—5 of FIGURE 3.

Referring first to FIGURES 1 and 2 it will be seen that exclusive of the blade B itself, the saw in general comprises a portable motor housing M having a handle H thereon, and a rigid arbor housing A projecting outwardly at a fixed attitude from the motor housing with a combination guard and guide G for the blade mounted on its end. The motor housing is of a form commonly seen today for power drills and the like. The arbor housing is in two parts, one of which takes the form of an elongated stem 2 which is suitably secured in or to a bushing mount at the forefront of the motor housing. The other part takes the form of an elbow casing 4 which is fixed to the outer end 2' of the stem 2 by means, inter alia, of an annular plate 6 having head bolts 8 passing through holes therein to secure the plate to the casing. Further reference will be made to FIGURES 1 and 2 at a later time but for the present reference should be made to the remaining figures which show the saw operating head. The principal function of the housing A is to house an arbor on which the circular or disc blade B can be mounted as seen. The arbor is in two sections and is driven by the motor (not shown) through the medium of a gear connection. The upper section can be seen at 12 extending interiorly and lengthwise of the stem. Its driving end is suitably supported and geared to the lower section 10 by bevel gearing and bearings which are housed with the driven end of the section 12 in the casing 4, but due to their conventional nature, are not specifically shown.

The arbor section 10 projects from the forward end of the casing 4 through a thick bushing-like snout 14 formed on the casing to act as a hub for a collar or band 16 that is journaled about it for reasons which will be explained.

Sufficient of the arbor is exposed to accommodate a flared bushing 18 acting as the backing for a washer 20 and head screw 22 mounting for the blade.

The guard and guide G are formed for the blade by a horseshoe shield plate 24 which is laterally flanged at 26 to overlie the periphery of the blade B and equipped with a lateral extension 28 at its base to form a type of planar slide that is commonly used as a guide in saws of this nature. The shield is also equipped with a curved bracket 30 that is secured to the back side of the shield. The bracket has a curvature which corresponds with that of the collar 16 so that it can fit over the outer cylindrical surface of the collar and be secured in an angular sense thereto for turning movement with the collar. Attachment of the bracket and the collar in this sense is effected by means of a pair of pins 32 and 34 which are affixed to the collar 16 at spaced points along its length so as to project outwardly and radially of the arbor in parallel relationship to one another. The bracket is apertured to receive the pins and in the assembly of the saw head, is passed down over the pins so as to be slidably engaged thereon. The bracket in consequence will turn with the collar, or vice versa, but is free nonetheless to slide up and down on the slideway furnished by the pins 32 and 34.

The upward travel of the bracket 30 is limited, however, by a cross plate assembly 36 secured to the upper ends of the pins, in part by heads 38 formed on the pins. The freedom of movement of the bracket is also limited by a coil spring 40 positioned over the pin 32 between the bracket 30 and the plate assembly 36. Thus the bracket is normally urged to move into a position abutting the limit provided by the collar 16 itself, and pressure must be applied counter to the spring, such as to the base of the slide 28, to dislodge it from this position.

The upward travel of the bracket 30 and thus of the shield 24, is also capable of variation through the provision of a slip 42 and set-screw 44 assembly on the pin 34, the adjustment of this assembly being used to shorten or lengthen the slideway as it is defined along pin 34. Though not shown, a scale on the latter pin is also useful in setting the adjustment.

The whole head assembly of shield, bracket, collar, and slideway is simply and conveniently keyed to the casing 4 in an axial sense by means of a sliding joint made between a circumferential groove 46 cut in the hub 14 below the position of pin 34, and the pin 34' of such pin which projects inwardly of the collar 16 so that it is received in the groove 46.

The use and manner of operation of the saw should now be apparent. The slide or guide 28 is positioned in relation to the arbor so that its base lies in a plane extending normal to the pins 32 and 34. Therefore, when upward pressure is applied to the guide, as by presenting it against the surface of a floor 48, the guide and, in fact, the entire guard and guide assembly G as comprised by shield 24, gives way under the resiliency of spring 40 to allow the lower chord segment of blade B to enter the floor, there being an oblong opening 50 in the shield to enable such movement of the shield transverse the arbor. Furthermore, referring again to FIGURES 1 and 2, it will be seen that the pivotal mounting of the guard and guide assembly on the casing 4 by way of the turnable collar 16, enables making a cut 52 in the floor along the left-hand wall 54 of a corner of a room by drawing the saw out of the corner in the direction of arrow 56; and thereafter making a second cut 58 along the right-hand wall 60 by directing the saw into the corner in the direction of arrow 62; both being executed with a handle grip, there being but the simple step of rocking the saw drive mechanism about the arbor to invert the handle H between cuts.

To further facilitate use of the saw against a wall as in this instance, the two sections of the arbor are geared at roughly 110° to one another and the slide 28 is lipped laterally as well as in front and back of the blade.

It will be appreciated that the assembly of the shield, bracket, collar, and slideway can be otherwise keyed to the casing 4, and that other changes and additions can likewise be made in and to the invention as shown without departing from the spirit and scope of the invention as it is defined in the claims following.

I claim as my invention:

1. In a portable motor-driven saw of the character described, a portable motor housing having a rigid arbor housing projecting outwardly at a fixed attitude therefrom, an arbor extending in a fixed rotatable position through the arbor housing from the motor housing, the end of said arbor housing having a collar member rotatably keyed thereon so as to be continuously free to turn about the arbor, said collar member having means fixed thereon which define a slideway that extends along a line coincident with a radius of the arbor, a shield member which defines a guard and a planar guide for a disc blade mounted on the arbor, and which is equipped with bracket means that are slidably engaged on the slideway, said planar guide being so positioned in relation to the arbor that its base lies in a plane extending normal to the aforementioned line, means defining limits for the slideway at points relatively remote from and relatively adjacent to the base of the planar guide, and resilient means urging the shield member to move into a position in which the bracket means abuts that slideway limit disposed relatively adjacent to the base of the guide.

2. A portable motor-driven saw according to claim 1 wherein the shield member straddles the arbor and has an opening receiving the same which is sized to allow for the movement of the shield member transverse the arbor.

3. A portable motor-driven saw according to claim 2 wherein the shield member is in the form of a horseshoe-shaped plate which is laterally flanged to overlie the periphery of the blade and equipped with a lateral extension at its base to form a planar slide functioning as a guide for the blade.

4. A portable motor-driven saw according to claim 1 wherein the slideway is defined by at least one pin that is radially outstanding from the collar member in the aforementioned line, the bracket means being slidably engaged over the pin and urged into a position abutting the collar member.

5. A portable motor-driven saw according to claim 4 wherein the pin has a slip and set screw assembly thereon which operates to define that slideway limit disposed relatively remote from the base of the guide.

6. A portable motor-driven saw according to claim 4 wherein the collar member has a second pin that is radially outstanding from it at a point spaced along its length from the first-named pin, there being a coil-spring disposed about the second pin and means adjacent the end of the latter pin operating to hold the spring captive against the bracket means.

7. A portable motor-driven saw according to claim 1 wherein the end of the arbor housing has a hub thereon through which the arbor projects, the collar member being turnably keyed to the hub about the arbor.

8. A portable motor-driven saw according to claim 1 wherein the arbor housing is in two parts, one of which takes the form of an elongated stem which projects outwardly along a straight line from the motor housing, and the other of which takes the form of an elbow which is fixed to the end of the stem.

9. A portable motor-driven saw according to claim 8 wherein the arbor is in two straight sections which are geared to one another in the elbow at approximately 110 degrees.

10. A portable motor-driven saw according to claim 1 wherein the slideway extends away from the collar member in the radially outward direction, and the bracket means are engaged to slide along the slideway independently of the collar member.

References Cited by the Examiner

UNITED STATES PATENTS

| | | | |
|---|---|---|---|
| 906,724 | 12/1908 | Koester | 143—43 |
| 1,813,231 | 7/1931 | Crowe | 143—159 |
| 2,301,264 | 11/1942 | Emery | 143—43 |
| 2,502,656 | 4/1950 | Koett | 143—43 |
| 2,520,411 | 8/1950 | Jenkins | 143—159 |
| 2,952,281 | 9/1960 | Weber | 143—43 |

FOREIGN PATENTS 1,122,360   5/1956   France.

HAROLD D. WHITEHEAD, *Primary Examiner.*

WILLIAM W. DYER, *Examiner.*